July 31, 1962 H. O. WOLF 3,047,642
HALOGENATION INITIATOR
Filed Feb. 17, 1960
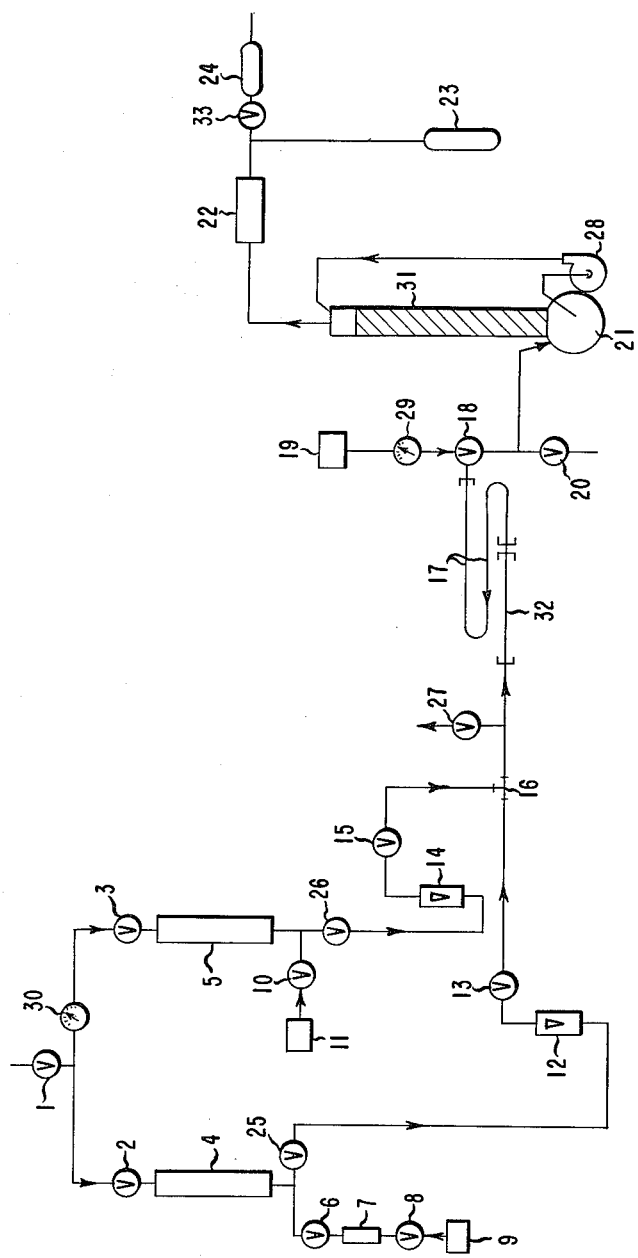
INVENTOR
HERBERT O. WOLF
BY Robert C. Kline
ATTORNEY

3,047,642
HALOGENATION INITIATOR

Herbert Otto Wolf, Mill Creek Hundred, Del., assignor to E. I. du Pont de Nemours and Company, Wilmington, Del., a corporation of Delaware
Filed Feb. 17, 1960, Ser. No. 9,289
4 Claims. (Cl. 260—653.8)

This invention relates to the preparation of monochloro-1,1-difluoroethanes and more particularly to the preparation of these ethanes by a low temperature chlorination of 1,1-difluoroethane in the presence of azo-bis-isobutyronitrile as an initiator.

The conventional chlorination of 1,1-difluoroethane at elevated temperatures in the gas phase, either under the influence of heat alone or effected by actinic radiation, results in the formation of an objectionable amount of by-products such as vinyl fluoride and acetylene. If the chlorodifluoroethane is to be used for the preparation of vinylidene fluoride these by-products must be removed if a pure vinylidene fluoride is to be readily obtained. The equipment for the higher temperature reactions is also subject to severe corrosion conditions.

It is an object of the present invention to provide a novel process for the preparation of monochloro-1,1-difluoroethanes. A further object is to provide a process for the chlorination of 1,1-difluoroethane whereby monochloro-1,1-difluoroethanes are obtained in high yields and the formation of unwanted by-products is substantially minimized. A still further object is to provide a process for preparing monochloro-1,1-difluoroethanes of high purity which requires simpler and less expensive equipment than has heretofore been required. Other objects will appear hereinafter.

These and other objects of this invention are accomplished by a process for the preparation of monochloro-1,1-difluoroethanes which comprises heating a solution of 0.2 to 0.9 mol of chlorine, 1.0 mol of 1,1-difluoroethane and 0.05 to 1.0 percent by weight of azo-bis-isobutyronitrile based on the 1,1-difluoroethane to a temperature of about 70 to 100° C. under a pressure of about 375 to 550 lbs./sq. in. gauge to initiate the reaction, continuing the reaction at temperatures of not over 450° C. and recovering the monochloro-1,1-difluoroethanes thereby obtained.

The process is most conveniently operated continuously, preferably utilizing a pipe of suitable material of construction as the reactor. Such equipment is described in detail below. A solution of the azonitrile initiator in 1,1-difluoroethane is prepared, the proper amount of liquid chlorine is introduced and dissolved and the solution is then passed into the reactor where it is heated to about 70 to 100° C. under a pressure of about 375 to 550 lbs./sq. in. At this temperature the azonitrile dissociates yielding free radicals which initiate the reaction. The exothermic heat of reaction raises the temperature and the liquid is vaporized. The reaction is continued at temperatures of not over 450° C. A steady state is reached with the heat of reaction removed by the vaporization of the liquid and sensible heat capacity of reactants and products. The peak temperature is determined by the molar proportion of chlorine present, lower proportions providing lower temperatures. External cooling is optional and usually unnecessary. The reaction takes place quite rapidly, probably in a few seconds. The chlorine is completely reacted. The chlorodifluoroethanes are suitably recovered by reducing the pressure, scrubbing the hydrogen chloride from the gas with an aqueous alkali solution, drying and condensing the hydrogen chloride-free gas, and recovering the chlorodifluoroethanes by distillation. Unreacted 1,1-difluoroethane is then recycled for further use. The principal product is 1,1,1-chlorodifluoroethane with a minor proportion of its isomer, 1,1-difluoro-2-chloroethane. The unreacted 1,1-difluoroethane boils at −25° C. at atmospheric pressure, while 1,1,1-chlorodifluoroethane boils at −9° C. The isomeric 1,1-difluoro-2-chloroethane boils at +35° C.

The azo-bis-isobutyronitrile functions as the initiator in the process of this invention. The amount used should be from about 0.05 to 1.0 percent by weight based on the weight of the 1,1-difluoroethane. At concentrations below 0.05 percent, there is insufficient azonitrile to furnish the necessary free radicals to obtain complete reaction of the chlorine. An unused excess of free radicals is obtained at concentrations of over 1.0 percent. The preferred concentration is from about 0.1 to 0.2 percent by weight of the 1,1-difluoroethane.

The amount of liquid chlorine employed should range from about 0.2 to 0.9 mol per mol of 1,1-difluoroethane used. Less than 0.2 mol gives too low a conversion. Less than the theory of chlorine (1.0 mol) is desirable to ensure complete utilization of chlorine. The preferred range is 0.4–0.6 mol.

As noted above, it is necessary to heat the mixture of chlorine, initiator and 1,1-difluoroethane to a temperature of 70 to 100° C. under a pressure of 375 to 550 lbs./sq. in gauge in order to initiate the reaction. The preferred pressure is about 500 to 550 lbs./sq. in. After initiation, the exothermic heat of reaction raises the temperature and the reaction is then continued at a temperature of not over 450° C. and under a pressure of 375 to 550 lbs./sq. in. gauge. At temperatures above 450° C. the amount of unwanted by-products, such as acetylene and vinyl fluoride, is increased. The molar proportion of chlorine employed determines the operating temperature in the absence of external cooling. The preferred reaction temperature, after initiation, is from about 150 to 200° C.

The chlorine reacts completely with the 1,1-difluoroethane and this takes place quite rapidly. The preferred reaction time, which is the residence time in the reactor, is from about 2 to 8 seconds. Longer times may be employed; however, they are of no advantage since the chlorine is completely reacted within several seconds.

The process may be operated either continuously or batchwise. In a continuous method conventional chemical process equipment is used in feeding and measuring the reactants to the reactor. The product gases are scrubbed to remove hydrogen chloride, dried, condensed and distilled by procedures well known in the field of fluorinated hydrocarbon processing. The reactor preferably consists of a length of pipe. Copper, steel, nickel, stainless steel and alloys such as Hastelloy and Monel are satisfactory materials of construction. It must withstand pressures of up to 550 lbs./sq. in. gauge, temperatures up to 450° C. and anhydrous hydrogen chloride as well as chlorine. The diameter and length of the pipe will vary according to the desired capacity of the reactor. Diameters of from a fraction of an inch to several inches are suitable. The length of the pipe may vary from about 10 times the diameter to about 500 times the diameter.

At least a portion of the front end of the pipe must be provided with heating means to raise the temperature of the solution passing through to 70° to 100° C. to initiate the reaction. The length of the heated section and the amount of heat to be applied obviously depend on the diameter of the reactor pipe and the rate of flow of liquid through it and are subject to chemical engineering calculation. The entire length may be jacketed for temperature control. Alternatively, the reactor may consist of a vessel with a height to diameter ratio of 1:1. This is most conveniently a section of pipe of suitable diameter, although other suitable types of conventional chemical vessels may be employed.

The process of this invention has numerous advantages and represents a distinct advance in the art. A high yield, about 95 to 99 percent, of combined 1,1,1-chlorodifluorethane and 1,1-difluoro-2-chloroethane is obtained and this total yield may be used for conversion to vinylidene fluoride. The latter compound is highly useful in the formation of fluoroelastomers. The process, since it is carried out at relatively low temperatures, imposes less corrosive conditions on the equipment. In addition external cooling of the reactor is not required. Thus, the reaction takes place under quasi adiabatic temperature conditions. The formation of unwanted by-products, such as acetylene and vinyl fluoride, is negligible. Also, the separation of the monochloro-1,1-difluoroethanes from unreacted 1,1-difluoroethane is quite simple and need not be rigorous since it has been found that recycling a small amount of the monochloro-1,1-difluoroethanes with the unreacted 1,1-difluoroethane does not result in any decrease in yield.

In the accompanying drawing a diagrammatic illustration is given of a preferred set-up for carrying out a continuous process according to the present invention. This type of a set-up was used in the following examples. In the continuous process illustrated, tank 4 is the feed tank for the 1,1-difluoroethane-initiator mixture and tank 5 is the chlorine feed tank. These reactants are measured through rotameters 12 and 14, mixed at T 16 and passed to reactor 32 and 17. A pressure reducing valve 18 releases the reaction mass to the sodium hydroxide scrubbing tower 31. The back pressure on valve 18 is controlled by nitrogen 19, measured by gauge 29. The gases are dried by drier 22 and collected in receiver 23 which is a vessel cooled with liquid nitrogen. The reactor 17 consists of a length of copper or stainless steel pipe, varying in different examples, from 14 inches to 50 feet, the diameter being 1/8 or 1/4 inch. A relatively short section 32 at the front end of the reactor is heated to initiate the reaction. The length of the section varies from about 6 inches to 4 feet, although in some cases the whole reactor is heated. Steam, hot water, and electrical resistance heaters are used.

The general method of operation is as follows: Valves 2, 3, 6, 10 and 18 are closed and the system is evacuated through (line and) valve 27. The requisite amount of azo-bis-isobutyronitrile is put in cartridge 7 and inserted in the line. Valve 25 is closed, valve 6 is opened and valve 8 is opened to introduce liquid 1,1-difluoroethane from storage 9. The initiator is dissolved by the 1,1-difluoroethane passing through cartridge 7 and the mixture passes into feed tank 4 until the desired weight has been introduced. Valve 6 is closed. Chlorine is introduced into feed tank 5 by closing valve 26 and opening valve 10 to admit chlorine from storage 11. When the desired weight has been admitted, valve 10 is closed. Nitrogen at a pressure of about 550 lbs./sq. in. measured on gauge 30 is then used to pressure the feed system by opening valve 1, to admit nitrogen from a constant pressure source, and valves 2 and 3. Valves 13 and 15 are closed and valves 25 and 26 are opened slowly to fill the feed systems liquid full. With valve 27 closed and valve 18 set to discharge at the desired pressure, by nitrogen from source 19 measured by gauge 29, liquid 1,1-difluoroethane-initiator is fed through rotameter 12 and valve 13 at the desired rate until the system is full of liquid. The initiating section of the reactor 32 is then heated to 85°±15° C. Liquid 1,1-difluoroethane is allowed to discharge from valve 18 until a steady temperature state has been achieved. Then the chlorine feed, at the desired rate, is commenced through rotameter 14 and valve 15. When the reaction commences in the initiating section 32 the heat of reaction vaporizes the mass and henceforth the gaseous reaction mass passes through reactor 17 and valve 18 to essentially atmospheric pressure and to scrubber 21. An aqueous 30% sodium hydroxide solution is circulated through the scrubber by pump 28 while the gases pass upward through the scrubbing tower 31 which is 6 feet high, 3 inches in diameter and packed which 1/4 inch saddles. The sodium hydroxide solution is replaced with fresh solution when the concentration of sodium hydroxide drops to 20%. The gases are then dried in tower 22 which is packed with anhydrous calcium sulfate and collected in receiver 23 which is a stainless steel vessel cooled in liquid nitrogen. Valve 20 is a sample line where samples were taken to test for complete utilization of chlorine by bubbling into aqueous potassium iodide solution in the presence of $CCl_4$. Absence of purple color formation in the $CCl_4$ indicated absence of chlorine in the exit gas. The dried product gases were sampled in a valved gas sample bulb 24, controlled by valve 33. The monochloro-1,1-difluoroethanes may be recovered by distillation of the products collected in receiver 23. The unreacted 1,1-difluoroethane may then be recycled.

The following examples will better illustrate the nature of the present invention; however, the invention is not intended to be limited to these examples. Parts are by weight unless otherwise indicated.

In the following examples the product gases were analyzed by mass spectrography. The percent conversion of 1,1-difluoroethane per pass was based on the unreacted 1,1-difluoroethane recovered. The yield percentages were calculated on the 1,1-difluoroethane not recovered. The conversion and yields are in terms of mol percent.

*Example 1*

The apparatus described above and in the accompanying drawing was used, the reactor 17 in this example being a 50 foot length of 1/4" diameter copper tubing. The first 4 feet of the tubing was wrapped with an electrical tape heater to form the initiator section 32. The feed stream of 1,1-difluoroethane contained 1% azo-bis-isobutyronitrile by weight as the initiator. The dried product gases were analyzed by mass spectrography. The operating conditions and analysis of the product gas are shown below. The chlorine was completely reacted as shown by the iodide test.

Feed rate, gram mols per hour:
    1,1-difluoroethane ($CF_2HCH_3$) _____ 7.03
    Chlorine _____ 2.84
    Mol ratio $Cl_2:CF_2HCH_3$ _____ 0.4
Reactor pressure, lbs./sq. in. gauge_____ 400±5
Peak temperature of gas leaving heating
    zone, ° C._____ 202
Percent conversion of 1,1-difluoroethane_____ 42.2
Yield, total chlorodifluoroethane, percent_____ 96.9
    Percent 1,1,1-chlorodifluoroethane_____ 85.3
    Percent 1,1-difluoro-2-chloroethane_____ 11.6

Analysis, mol percent:
    $CF_2Cl-CH_3$ _____ 36.0
    $CF_2H-CH_2Cl$ _____ 4.0
    $CF_2Cl-CH_2Cl$ _____ 0.4
    $CHFCl-CHFCl$ _____ 0.3
    $CHCl_3$ _____ 0.5
    $CF_2H-CH_3$ _____ 57.8

Example 2

A, B and C. The procedure of Example 1 was followed except that in 2A and 2C the reactor 17 was a 10 foot length of ¼ inch diameter copper tubing in the form of a coil which was immersed in a hot water bath at 99–100° C. In 2B the reactor 17 was a 4 foot length of ⅛ inch stainless steel tubing jacketed with 110° C. steam over the entire length. The concentration of azo-bis-isobutyronitrile in the 1,1-difluoroethane was 0.1% by weight in A and B. It was 0.3% in C. The data are shown below:

|  | A | B | C |
|---|---|---|---|
| Feed rate, gram mols per hour: |  |  |  |
|   1,1-difluoroethane ($CF_2HCH_3$) | 9.9 | 12.4 | 10.33 |
|   chlorine | 3.09 | 5.6 | 2.24 |
|   Mol ratio $Cl_2$:$CF_2HCH_3$ | 0.31 | 0.45 | 0.22 |
| Reactor pressure, lbs./sq. in. gauge | 390±5 | 525±5 | 390±5 |
| Temperature of gas leaving reactor | 96–98 | (¹) | 98 |
| Percent Conversion of 1,1-difluoroethane | 20.3 | 40.1 | 10.1 |
| Yield, total chlorodifluoroethane, percent | 98.4 | 97.2 | 98.8 |
| Percent 1,1,1-chlorodifluoroethane | 95.0 | 89.0 | 97.8 |
| Percent 1,1-difluoro-2-chloroethane | 3.4 | 8.2 | 1.0 |
| Analysis—Mol percent: |  |  |  |
|   $CF_2Cl$—$CH_3$ | 19.3 | 35.7 | 9.9 |
|   $CF_2H$—$CH_2Cl$ | 0.7 | 3.3 | 0.1 |
|   $CF_2H$—$CH_3$ | 79.7 | 59.9 | 89.9 |
|   Others | 0.3 | 1.1 | 0.1 |

¹ Temperature readings at various distances from the front end of the reactor:

| Inches | Degrees |
|---|---|
| 20 | 95 |
| 28 | 115 |
| 32 | 128 |
| 36 | 285 |
| 40 | 243 |

D. A run under conditions essentially the same as "B" was made in which the 1,1-difluoroethane-initiator feed contained 27 mol percent hydrogen chloride. The total yield of chlorodifluoroethane was 94.5% showing that the hydrogen chloride caused only a slight decrease in yield.

Example 3

The procedure of Example 1 was followed except that in 3A the reactor was a 14 foot length of ¼ inch diameter copper tubing having a 6 inch initiator section heated with 110° C. steam located 31 inches downstream from the front end of the reactor. In 3B the reactor was a 4 foot length of ¼ inch diameter copper tubing having a 6 inch initiator section heated with 110° C. steam 2 inches from the front end of the reactor. The concentration of azo-bis-isobutyronitrile in the 1,1-difluoroethane was 0.1% by weight. The data are given below:

|  | A | B |
|---|---|---|
| Feed rate, gram mols per hour: |  |  |
|   1,1-difluoroethane ($CF_2HCH_3$) | 9.01 | 10.0 |
|   chlorine | 3.18 | 5.69 |
|   Mol ratio $Cl_2$:$CF_2HCH_3$ | 0.35 | 0.57 |
| Reactor pressure, lbs./sq. in. gauge | 455±5 | 460±5 |
| Gas temperature after initiation | 148 | ¹ 259 |
| Percent conversion of 1,1-difluoroethane | 35 | 52.3 |
| Yield, total chlorodifluoroethane, percent | 98.1 | 92.0 |
| Percent 1,1,1-chlorodifluoroethane | 92.9 | 82.2 |
| Percent 1,1-difluoro-2-chloroethane | 5.2 | 9.8 |
| Analysis, Mol percent: |  |  |
|   $CF_2Cl$—$CH_3$ | 32.5 | 43.0 |
|   $CF_2H$—$CH_2Cl$ | 1.8 | 5.1 |
|   $CF_2H$—$CH_3$ | 65.0 | 47.7 |
|   Others | 0.7 | 4.2 |

¹ At a point about 10 inches from the end of the heated zone into the reaction zone the temperature of the product gases reached a maximum of 428° C.

The temperature in 3B was higher than the preferred range of 150–200° C. and the yield is correspondingly somewhat lower than that of 3A where the temperature was lower. Part of this effect is due, of course, to the higher chlorine concentration and hence high percentage conversion of 1,1-difluoroethane with the concomitant increase in evolved heat of reaction.

Example 4

The procedure of Example 1 was followed except that the reactor in this example was a 40 inch length of ¼ inch diameter copper tubing. The first 8 inches of the reactor were wrapped with an electrical tape heater for the initiation zone. The heated section was held at a temperature of about 105–110° C. In each of the A and B runs 1,1,1-chlorodifluoroethane was mixed with the feed of 1,1-difluoroethane. It will be noted that even in A where the proportion of 1,1,1-chlorodifluoroethane is very high, the overall yield is still reasonably good. The concentration of azo-bis-isobutyronitrile in A was 0.4% and in B 0.075% by weight. In both cases the chlorine was completely reacted as shown by the iodide test. The data for the runs are shown below:

|  | A | B |
|---|---|---|
| Feed rate, gram mols per hour: |  |  |
|   1,1-difluoroethane ($CF_2HCH_3$) | 2.64 | 7.5 |
|   1,1,1-chlorodifluoroethane ($CF_2ClCH_3$) | 4.83 | 3.0 |
|   chlorine | 2.45 | 4.4 |
|   Mol ratio $Cl_2$: $CF_2HCH_3$ | 0.93 | 0.5 |
| Reactor pressure, lbs./sq. in. gauge | 525±15 | 530±2 |
| Gas temperature after initiation | 258 | 19 |
| Percent Conversion of 1,1-difluoroethane ¹ | 85.0 | 23.0 |
| Yield, total chlorodifluoroethane percent ¹ | 87.0 | 98. |
| Percent 1,1,1-chlorodifluoroethane | 84.7 | 94. |
| Percent 1,1-difluoro-2-chloroethane | 2.3 | 4. |
| Analysis Mol percent: |  |  |
|   $CF_2Cl$—$CH_3$ | 90.1 | 44. |
|   $CHF_2$—$CH_2Cl$ | 0.7 | 0. |
|   $CF_2H$—$CH_3$ | 5.3 | 54. |
|   Others | 3.9 | 0. |

¹ Assuming 100X recovery of 1,1-1-chlorodifluoroethane.

Example 5

The procedure of Example 1 was followed except that the reactor consisted of a steel piece of pipe 2.65 inches inside diameter and 2.65 inches long. The top and bottom were capped with steel plates. The pipe was jacketed and 110° C. steam was maintained in the jacket. The liquid feed was introduced through a ¹⁄₃₂ inch inside diameter hole midway of one side of the reactor and the product gas was removed through a ¼ inch inside diameter pipe in the top of the reactor. Otherwise the apparatus was the same as before. The initiator was 0.1% by weight of azo-bis-isobutyronitrile dissolved in the 1,1-difluoroethane. The data are given below:

Feed rate, gram mols per hour:
  1,1-difluoroethane ($CF_2HCH_3$) _____ 9.2
  Chlorine _____ 4.3
  Mol ratio $Cl_2$:$CF_2HCH_3$ _____ 0.4
Reactor pressure, lbs./sq.in. gauge _____ 45(
  Gas temperature in reactor, ° C. _____ 13
  Percent conversion of 1,1-difluoroethane _ 46.
  Yield, total chlorodifluoroethane, percent _ 99.
    Percent 1,1,1-chlorodifluoroethane _____ 97.
    Percent 1,1-difluoro-2-chloroethane ____ 1.
Analysis, mol percent:
  $CF_2Cl$-$CH_3$ _____ 44.
  $CF_2H$-$CH_2Cl$ _____ 0.
  $CF_2H$-$CH_3$ _____ 53.
  Other _____ 0.

As many widely different embodiments of this invention may be made without departing from the spirit and scope thereof, it is to be understood that this invention is not limited to the specific embodiments thereof except as defined in the appended claims.

What is claimed is:

1. A process for the preparation of monochloro-1,1 difluoroethanes which comprises forming a solution o 0.2 to 0.9 mol of chlorine, 1.0 mol of 1,1-difluoroethan and, as the sole initiator for the reaction, 0.05 to 1.0 per cent by weight of azo-bis-isobutyronitrile based on th weight of 1,1-difluoroethane, heating the resulting solu tion to a temperature of about 70 to 100° C. under a pres sure of about 375 to 550 lbs./sq. in. gauge to initiate th reaction, continuing the reaction at temperatures of not over 450° C. and recovering the monochloro-1,1-difluoroethanes thereby obtained.

2. A process according to claim 1 wherein the amount of azo-bis-isobutyronitrile employed is from about 0.1 to 0.2 percent by weight based on the weight of 1,1-difluoroethane.

3. A process according to claim 2 wherein the reaction after initiation is continued at a temperature of from about 150 to 200° C.

4. A process according to claim 3 wherein the amount of chlorine is 0.4 to 0.6 mol.

References Cited in the file of this patent

UNITED STATES PATENTS 2,899,472    Bower et al. _____ Aug. 11, 1959

FOREIGN PATENTS 785,209    Great Britain _____ Oct. 23, 1957